(12) United States Patent
Wurlitzer

(10) Patent No.: US 12,458,170 B1
(45) Date of Patent: Nov. 4, 2025

(54) BARBECUE APPARATUS

(71) Applicant: Douglas P. Wurlitzer, Chico, CA (US)

(72) Inventor: Douglas P. Wurlitzer, Chico, CA (US)

(*) Notice: Subject to any disclaimer, the term of this patent is extended or adjusted under 35 U.S.C. 154(b) by 690 days.

(21) Appl. No.: 17/889,138

(22) Filed: Aug. 16, 2022

(51) Int. Cl.
*A47J 37/07* (2006.01)

(52) U.S. Cl.
CPC .... *A47J 37/0786* (2013.01); *A47J 2037/0795* (2013.01)

(58) Field of Classification Search
CPC ........................ A47J 37/0786; A47J 2037/07
See application file for complete search history.

(56) References Cited

U.S. PATENT DOCUMENTS

| | | | | |
|---|---|---|---|---|
| 2,213,483 A | * | 9/1940 | Benson | A47J 37/0704 126/14 |
| 2,604,884 A | * | 7/1952 | Walker | A47J 37/0772 126/30 |
| 3,478,733 A | * | 11/1969 | Meyerhoefer | A47J 37/0768 126/25 R |
| D276,688 S | * | 12/1984 | Lee | D7/332 |
| 4,541,406 A | * | 9/1985 | DaSambiagio | F24B 1/205 99/446 |
| 4,607,608 A | * | 8/1986 | Allred | A47J 33/00 126/30 |
| D356,005 S | * | 3/1995 | Goble | D7/337 |
| D362,585 S | * | 9/1995 | Thompson | D7/337 |
| 5,809,988 A | * | 9/1998 | Wagner | A47J 37/0731 126/25 R |
| 6,131,505 A | * | 10/2000 | Lin | A47J 37/0745 99/341 |
| 6,386,192 B1 | * | 5/2002 | Weber | A47J 33/00 126/30 |
| 6,694,965 B1 | * | 2/2004 | Chen | A47J 37/0704 99/393 |
| 6,827,077 B1 | * | 12/2004 | Haas | A47J 37/067 126/30 |
| 6,845,705 B1 | * | 1/2005 | Chen | A47J 37/0704 99/450 |
| 7,140,362 B1 | * | 11/2006 | Johnston | A47J 37/049 126/30 |
| 7,647,923 B2 | * | 1/2010 | Dahl | A47J 37/0731 126/25 AA |
| 9,474,415 B2 | * | 10/2016 | Banal | A47B 13/081 |
| D1,000,189 S | * | 10/2023 | Zhang | D7/334 |
| 12,171,364 B2 | * | 12/2024 | Wagner | A47J 33/00 |
| 2011/0192390 A1 | * | 8/2011 | Johnson | A47J 33/00 126/30 |
| 2020/0077840 A1 | * | 3/2020 | White | A47J 37/0763 |

FOREIGN PATENT DOCUMENTS

FR 2444438 A * 8/1980 ............. A47J 37/07

* cited by examiner

*Primary Examiner* — Woody A Lee, Jr.
(74) *Attorney, Agent, or Firm* — Theodore J. Bielen, Jr.

(57) ABSTRACT

A ground supported barbecue apparatus utilizing a stand having a frame that supports a tray with a grill. The tray and grill are vertically positioned by a height adjuster to ensure cooking of foodstuffs at a proper temperature and above an ignited fuel source below the frame.

4 Claims, 4 Drawing Sheets

BARBECUE APPARATUS

BACKGROUND OF THE INVENTION

The present application relates to a novel and useful barbecue apparatus which is ground supported.

Grilling of foods has existed in the Americas since pre-colonial times. There are generally several varieties of grills that are categorized according to the source of heat. For example, barbecue grills are known as gas-fueled, charcoal, or electric.

In addition, charcoal grills may employ any wood-derived material, such as scrap wood, branches, and the like, to grill foods. Charcoal grills are normally constructed with a fixed pan or kettle to hold charcoal briquettes or natural lump charcoal as a fuel source. When ignited, such fuel sources radiate heat necessary to cook food on a grill located above the pan. The elevation of the grill above the source of heat is usually fixed in conventional barbecue grills. Thus, the only control of the heat delivered to the food being grilled is determined by the quantity and type of fuel located below the grill.

A barbecue grill that includes a grill or grate having an adjustable height above the source of heat would be a notable advance in the field of food preparation.

SUMMARY OF THE INVENTION

In accordance with the present application, a novel and useful ground-supported barbecue apparatus is hereinafter provided.

The barbecue, herein presented, includes a stand having a ground surface contacting portion and an outwardly extending portion connected to the ground contacting portion. The outwardly extending portion includes a frame. A tray is also found in the apparatus of the present application and holds a grate or grill and is located above the ground surface contacting portion of the stand. The tray is freely movable relative to the ground surface contacting portion of the stand. Needless to say, the grill of the tray is also movable relative to the ground surface, where the fuel source is located.

A height adjuster is further utilized in the barbecue of the present application and positions the tray and the grill a certain distance relative to the ground surface. The adjuster includes at least one cable linked to the tray and a turnable crank for selectively moving the cable relative to the stand. The height adjuster may also include a rotatable shaft which connects to the crank and is rotatably held to the outwardly extending portion of the stand. In certain cases, a pair of cables may be used in conjunction with the rotatable shaft rotatably held to the stand and operated by the crank. The cable or cables wrap or unwrap about the rotatable shaft when the crank is turned.

A guide is also employed in the present apparatus to stabilize the position of the tray relative to the stand. A brake is also found in the apparatus of the present application for arresting the rotational movement of the shaft and crank to fix the position of the tray and grill relative to the ground. The brake may include a spring circumventing the rotatable shaft, which lies between a flange fixed to the shaft and the outward extending portion of the stand. The spring would frictionally engage the flange and the outwardly extending portion of the stand to a sufficient degree in order to arrest the rotational movement of the shaft and crank as desired. Such arresting of the shaft and crank would hold or fix the tray or grill at a certain height or distance above the ground surface when the barbecue is cooking foodstuffs. Needless to say, the quantity of heat emanating from the source of fuel placed on the ground below the grill and tray would determine the height of the tray and grill to properly cook foodstuffs located on the grill.

It may be apparent that a novel and useful barbecue apparatus has been hereinabove described.

It is therefore an object of the present application to provide a barbecue apparatus that possesses a grill that is adjustable in height relative to the ground below.

Another object of the present application is to provide a barbecue grill which is of durable construction and may be assembled and disassembled easily.

Another object of the present application is to provide a barbecue apparatus that is capable of employing a fuel source of varying types to deliver heat to the food being grilled.

Another object of the present application is to provide a barbecue apparatus that possesses an adjustable height of the grill above the ground surface to control the amount of heat delivered to the food being grilled.

The application possesses other objects and advantages especially as concerns particular characteristics and features thereof which will become apparent as the specification continues.

Figure 1:
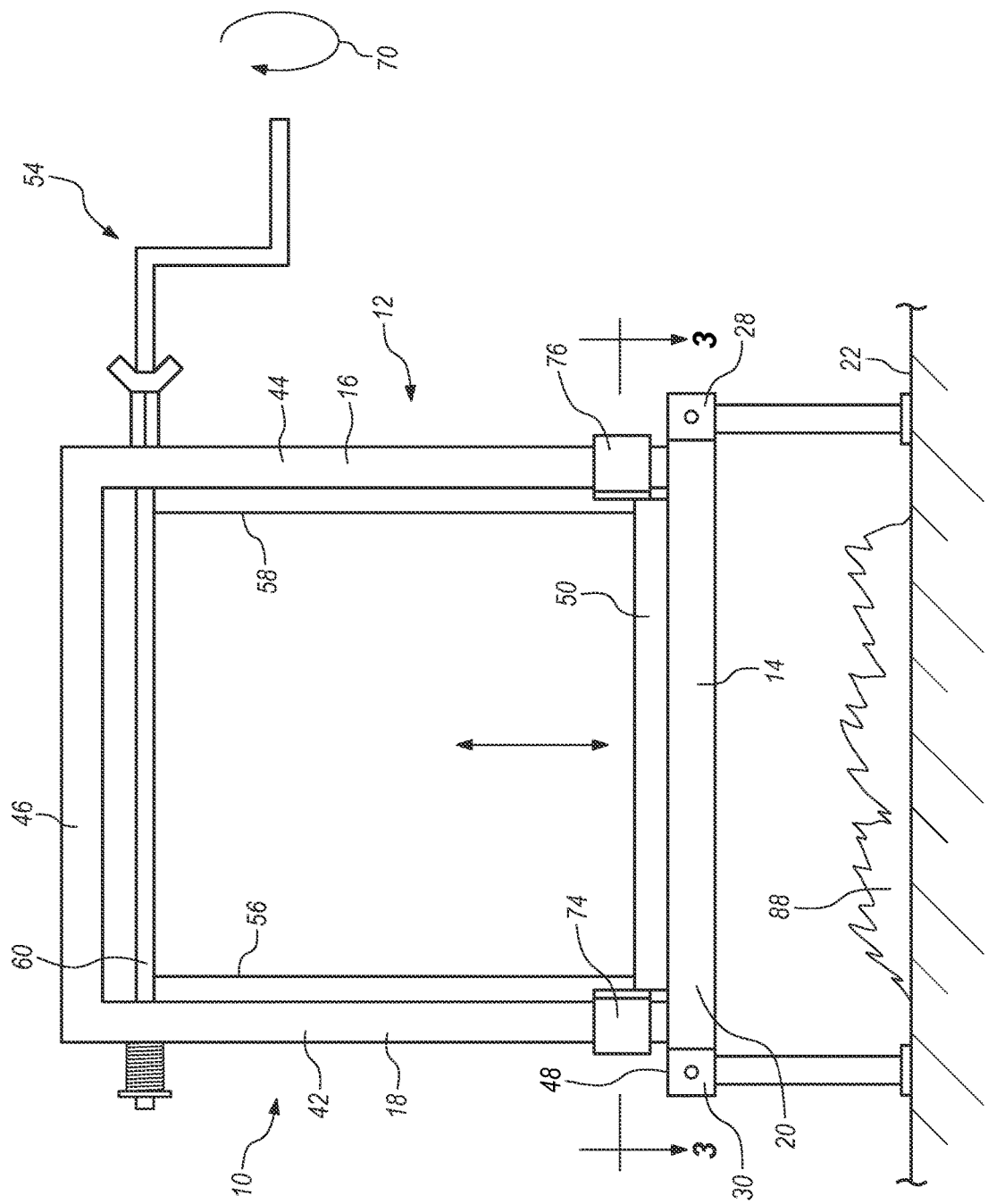
FIG. 1 is a front elevational view of the barbecue apparatus with movable tray and grill in the down position.

For a better understanding of the application, reference is made to the following detailed description of the preferred embodiments thereof which should be referenced to the prior described drawings.

DETAILED DESCRIPTION OF THE PREFERRED EMBODIMENTS

Various aspects of the present application well evolve from the following detailed description of the preferred embodiments thereof which should be referenced to the prior delineated drawings.

The barbecue apparatus as a whole is depicted in the drawings by reference character 10.

With reference to FIG. 1, it may be observed that apparatus 10 includes, as one of its elements, a stand 12 having a ground contacting portion 14 and an outwardly extending portion 16, including a frame 18.

Figure 3:
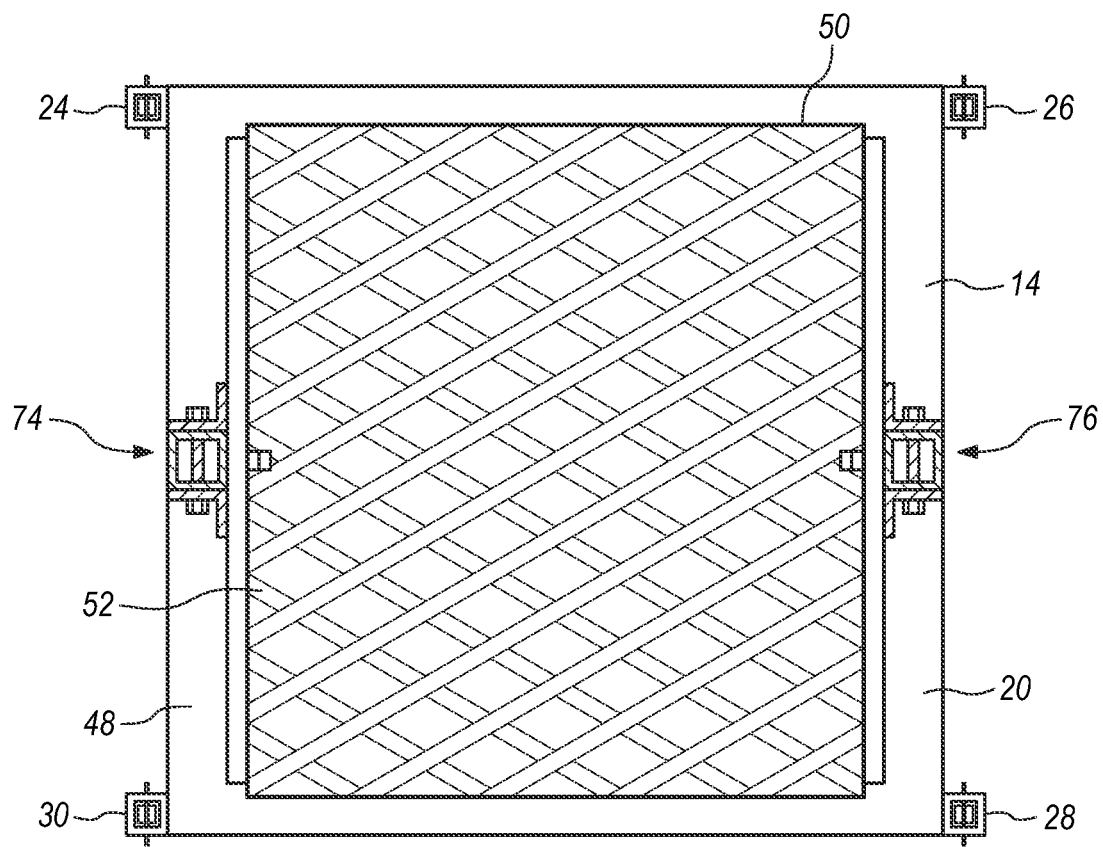
FIG. 3 is a sectional view taken along line 3-3 of FIG. 1.
Figure 6:
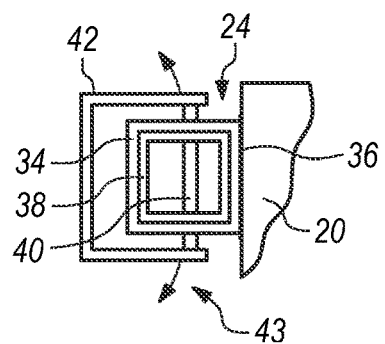
FIG. 6 is a top plan view of an exemplary leg for the stand.

Ground contacting portion 14 is provided with a platform 20 supported above ground surface 22 by removable legs 24, 26, 28, and 30, FIGS. 1 and 3. With reference to FIG. 6, it may be observed that a top plan view of exemplary leg 24 is depicted and is typical of the construction of legs 26, 28, and 30. Leg 24 includes a bracket 34 which is welded to platform 20 at weld line 36. An elongated square tube 38 slidingly engages the interior of bracket 34 and is held thereto by a pin 40. A spreadable retaining spring 42 (directional arrows 43) holds pin 40 in place and allows the removal of pin 40 when elongated square tube 38 is to be removed from bracket 34 for storage. Needless to say, the square tubes of legs 26, 28, and 30 are removed in a similar manner for storage.

Frame 18 of outwardly extending portion 16 of stand 12 is formed with hollow vertical members 42 and 44 and a hollow/contiguous cross member 46. Frame 18 rests on and is removable from surface 48 of platform 20. For example, hollow frame member 44 slips over a supporting stud 45 and is held thereto by removable pin 47, FIG. 2. Frame member 42 is similarly formed. Thus, frame 18 may be removed for storage when apparatus 10 is not in use.

A tray 50 is employed in apparatus 10 and is constructed to hold open grill 52. Tray 50 and held grill 52 may initially rest or locate adjacent to surface 48 of platform 20. As may be apparent hereinafter, tray is freely movable relative to ground surface contacting portion 14 of apparatus 10. Open grill 52 receives heat from ignited fuel source 88.

Figure 5:
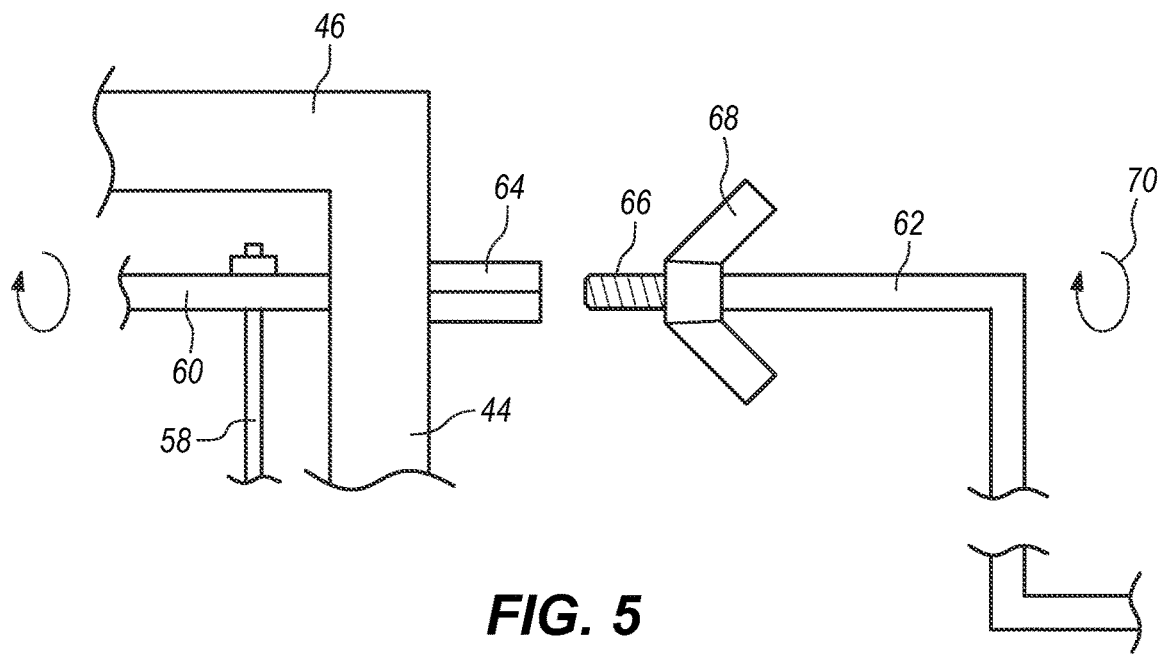
FIG. 5 is a partial front elevational view of a portion of the apparatus depicting the rotating shaft and crank.

Apparatus 10 further possesses a height adjuster 54 for positioning tray 50 and open grill 52 at a certain distance relative to ground surface 22. Height adjuster 54 is formed with cables 56 and 58 that may be of aircraft grade. Cables 56 and 58 are connected to a rotatable shaft 60 which is linked to a removable crank 62. Rotatable shaft 60 may be turned relative to supporting frame 16. FIG. 5 details the interconnection between removable crank 62 and rotatable shaft 60. As may be observed, an internally threaded boss 64 engages a threaded extension 66 of crank 62. Wing nut 68 holds crank 62 to internally threaded boss 64 when in use. Further, internally threaded boss connects to rotatable shaft 60 through frame member 44 such that the turning of crank 62, directional arrow 70, also rotates internally threaded boss and rotatable shaft 60. Such movement wraps and unwraps cables 56 and 58 about rotatable shaft 60 and positions tray 50 and open grill 52 at a certain distance relative to ground surface 22.

Figure 2:
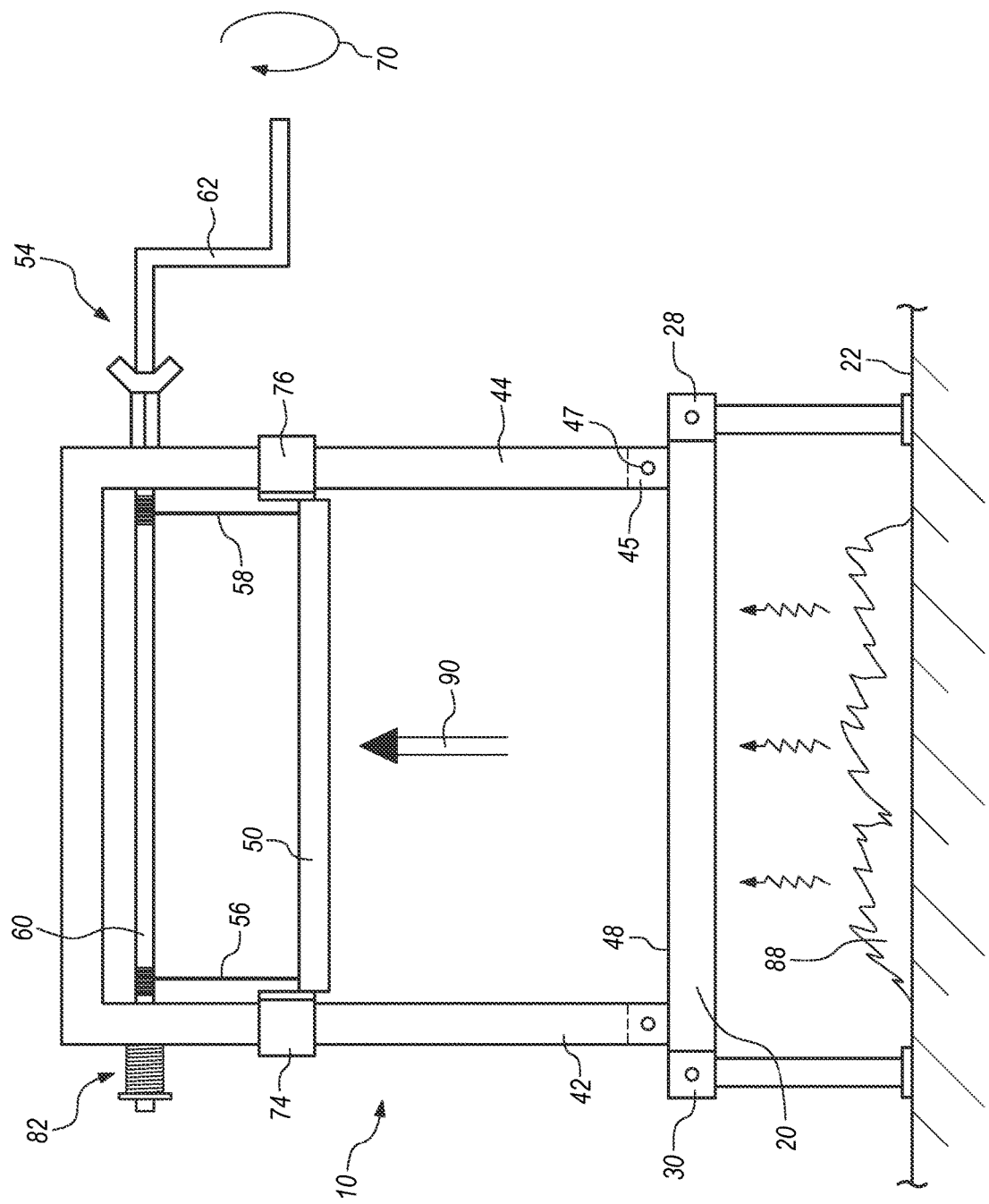
FIG. 2 is a side elevational view of the barbecue apparatus showing the movable tray and grill in a raised position.

With reference to FIG. 2, it may be observed that tray 50 and open grill 52 have been raised from a resting position on or near surface 48 of platform 20 to a position at a certain distance above ground surface 22. Cables 56 and 58 are shown partially wrapped about shaft 60 due to the turning of crank 62.

Figure 4:
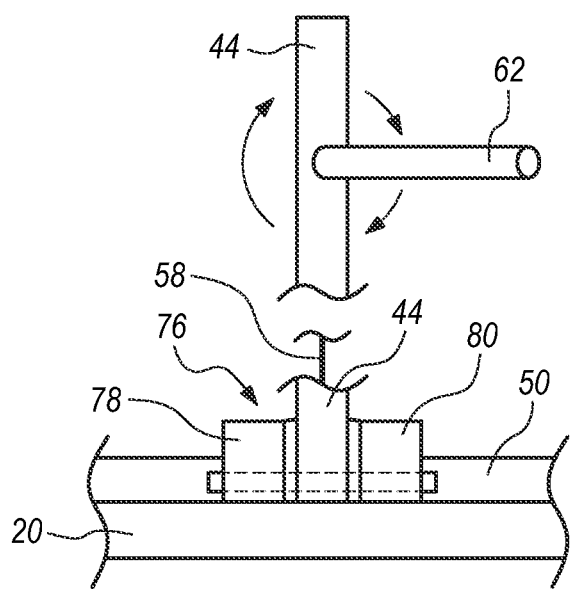
FIG. 4 is a partial side elevational view of the apparatus of FIG. 1 showing the operation of the crank.
Figure 7:
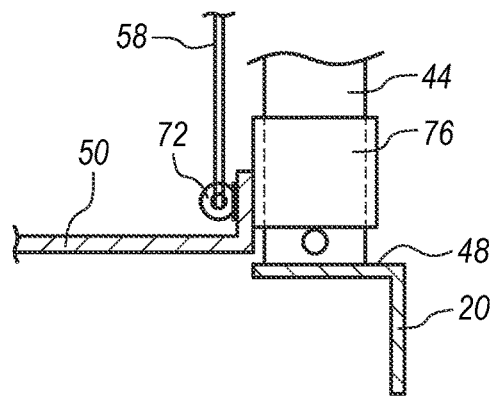
FIG. 7 is a partial front view partially depicting the connection of the cable relative to the tray and frame.

Referring to FIG. 7, it may be seen that cable 58 connects to tray 50 by the use of a ring 72 which has been welded to tray 50. Guides 74 and 76 stabilize the positioning of tray 50 in its movement upwardly or downwardly along vertical members 42 and 44. With reference to FIG. 4, it may be seen that exemplary guide 76 is fashioned by L-shaped members 78 and 80 that are welded to tray 50 and, thus, moves along vertical member 44 with tray 50. Guide 74 is similarly fashioned.

Figure 8:
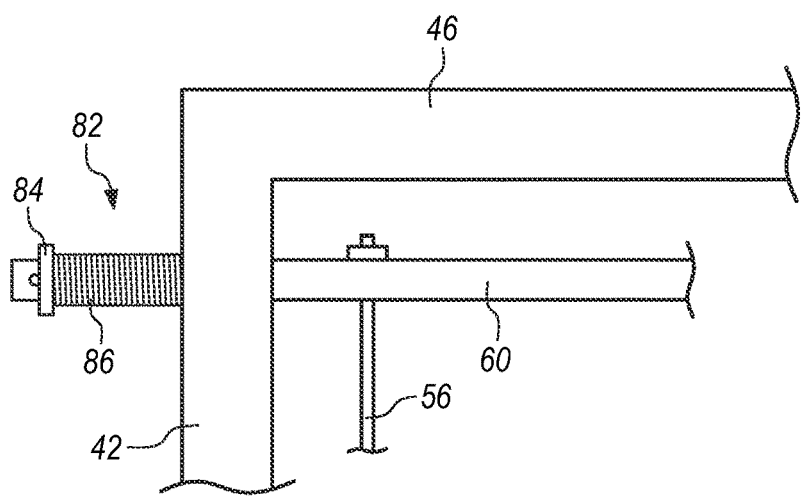
FIG. 8 is a partial elevational view depicting the rotating shaft relative to the frame and the stop mechanism associated therewith.

A brake 82 is also found in apparatus 10 for arresting the rotational movement of shaft 60. With respect to FIG. 8, it may be apparent that shaft 60 extends through vertical member 42 of frame 18 and terminates in a flange 84. A spring 86 circumvents shaft 60 and is positioned between flange 84 and vertical member 42. Spring 86 frictionally engages flange 84, vertical member 42, and rotatable shaft 50 to an extent that allows the rotation of shaft 60 by crank 62, but prevents the counter rotation of shaft 50 when crank 62 is released.

In operation, the user of barbecue apparatus 10 provides selective fuel 88 below platform 20 atop ground surface 22. Igniting fuel 88 produces heat which rises up to grill 52 to cook a foodstuff. Fuel 88 may take the form of any wood based substance, such as chips, branches, charcoal, and the like. Grill 52 within tray is then positioned above ground surface 52 by the use of height adjuster 54, specifically by the turning of crank 62. Brake 82 retains grill 52 in the desired position above ground surface while foodstuffs are cooked on grill 52. Directional arrow 90, FIG. 2, shows the movement of tray 50 and grill 52 upwardly from a position on or adjacent to surface 48 of platform 20. Thus, the movement of tray 50 and grill 52 controls the cooking temperature for foodstuffs located on tray 52. Apparatus 10 may be easily assembled and disassembled for storage by removing legs 24, 26, 28, and 30 and frame 16 from platform 20. Crank 62 is also removable and connected to rotatable shaft by loosening wing nut 68 and operating the threaded engagement of boss 564 and extension 66.

When stacked, the disassembled components of barbecue apparatus occupy a compact storage space of approximately 24 inches (61 cm) in width, 20.25 inches (51.4 cm) in depth, and 4.5 inches (11.4 cm) in height.

While in the foregoing embodiments of the application have been set forth in considerable detail for the purposes of making a complete disclosure of the invention, it may be apparent to those of skill in the art that numerous changes may be made in such detail without departing from the spirit and principles of the application.

What is claimed is:

1. A ground supported barbecue apparatus, comprising:
   a stand, said stand comprising ground surface contacting portion and an outwardly extending portion connected thereto, said outwardly extending portion including a frame;
   a tray, said tray possessing an open grill located adjacent said ground surface contacting portion of said stand and being freely movable relative to said ground surface contacting portion of said stand;
   a height adjuster for positioning said tray possessing said grill at a certain distance relative to the ground surface, said adjuster further comprising at least one cable linked to said tray and a crank for selectively moving said one cable relative to said stand, and a shaft rotatably held to said outwardly extending portion of said stand, said crank being connected to shad shaft;
   a brake for arresting the rotational movement of said shaft, said brake comprising a spring circumventing said shaft, and a flange fixed to said shaft, said spring being positioned between said flange and said outwardly extending portion of said stand and frictionally engaging said shaft, said flange, and said outwardly extending portion of said stand; and
   a guide for stabilizing the portion of said tray relative to said stand.

2. The apparatus of claim 1 which further comprises another cable linked to said tray, said crank selectively and simultaneously moving said one and another cables relative to said stand.

3. The apparatus of claim 1 in which said ground contacting portion of said stand includes a rest for said tray, said rest being located at a certain distance from the ground surface.

4. The apparatus of claim 3 which further comprises another cable linked to said tray, said crank selectively and simultaneously moving said one and another cables relative to said stand.

* * * * *